March 3, 1970   R. E. BROCHETTI   3,497,919
MOLD LOCK-UP MECHANISM FOR INJECTION MOLDING MACHINES
Filed Nov. 7, 1966   5 Sheets-Sheet 1
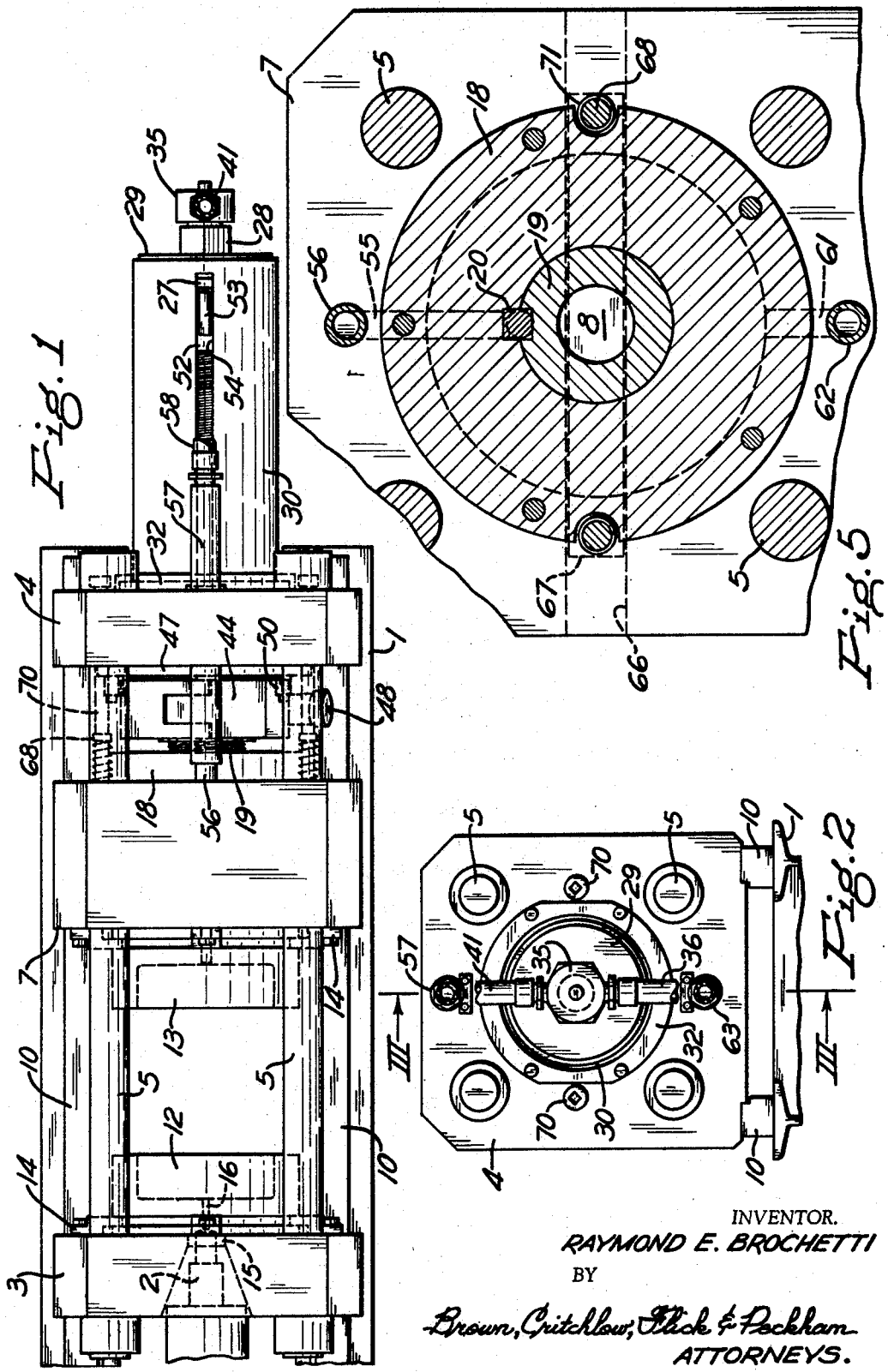
INVENTOR.
RAYMOND E. BROCHETTI
BY
Brown, Critchlow, Flick & Peckham
ATTORNEYS.

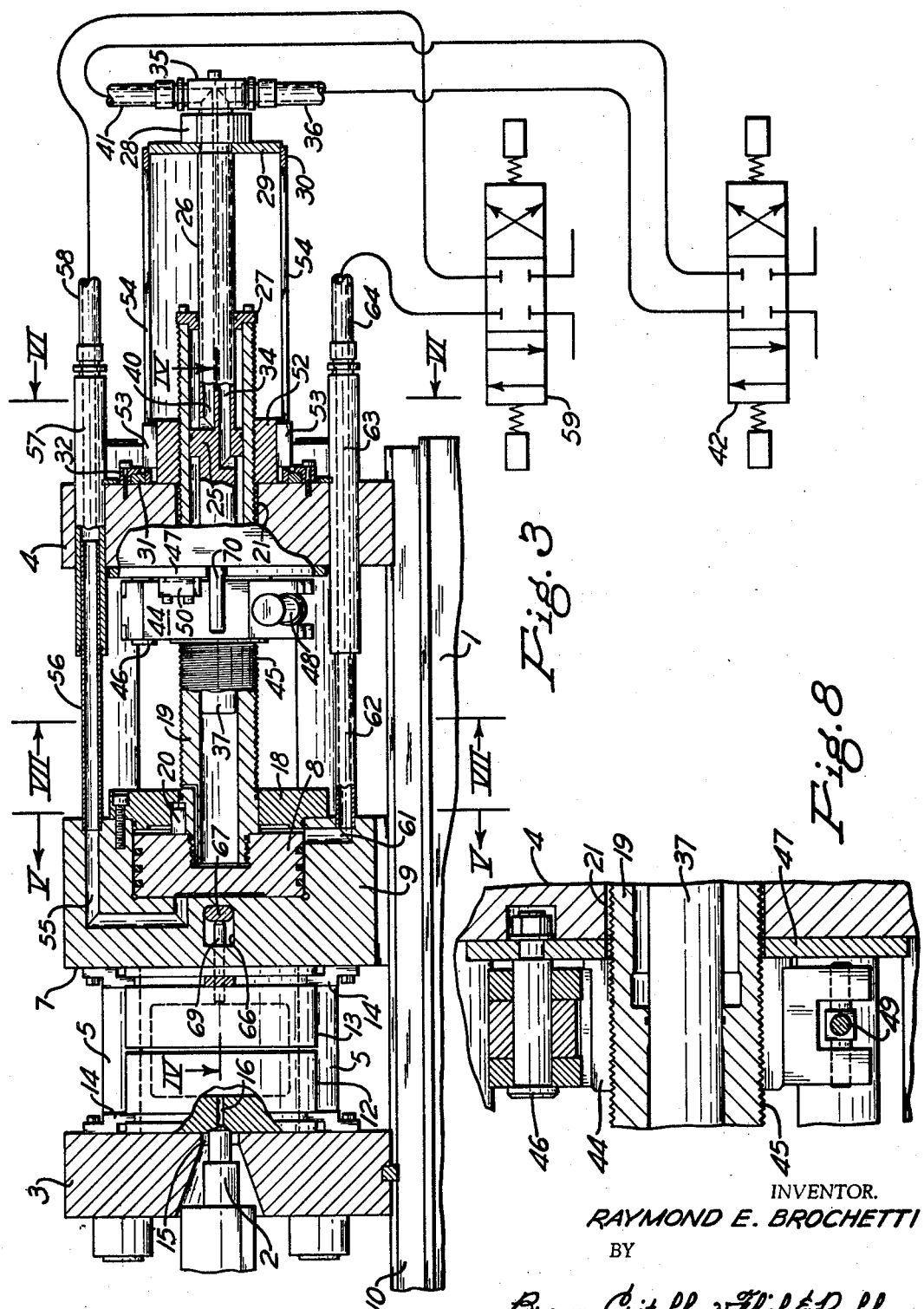

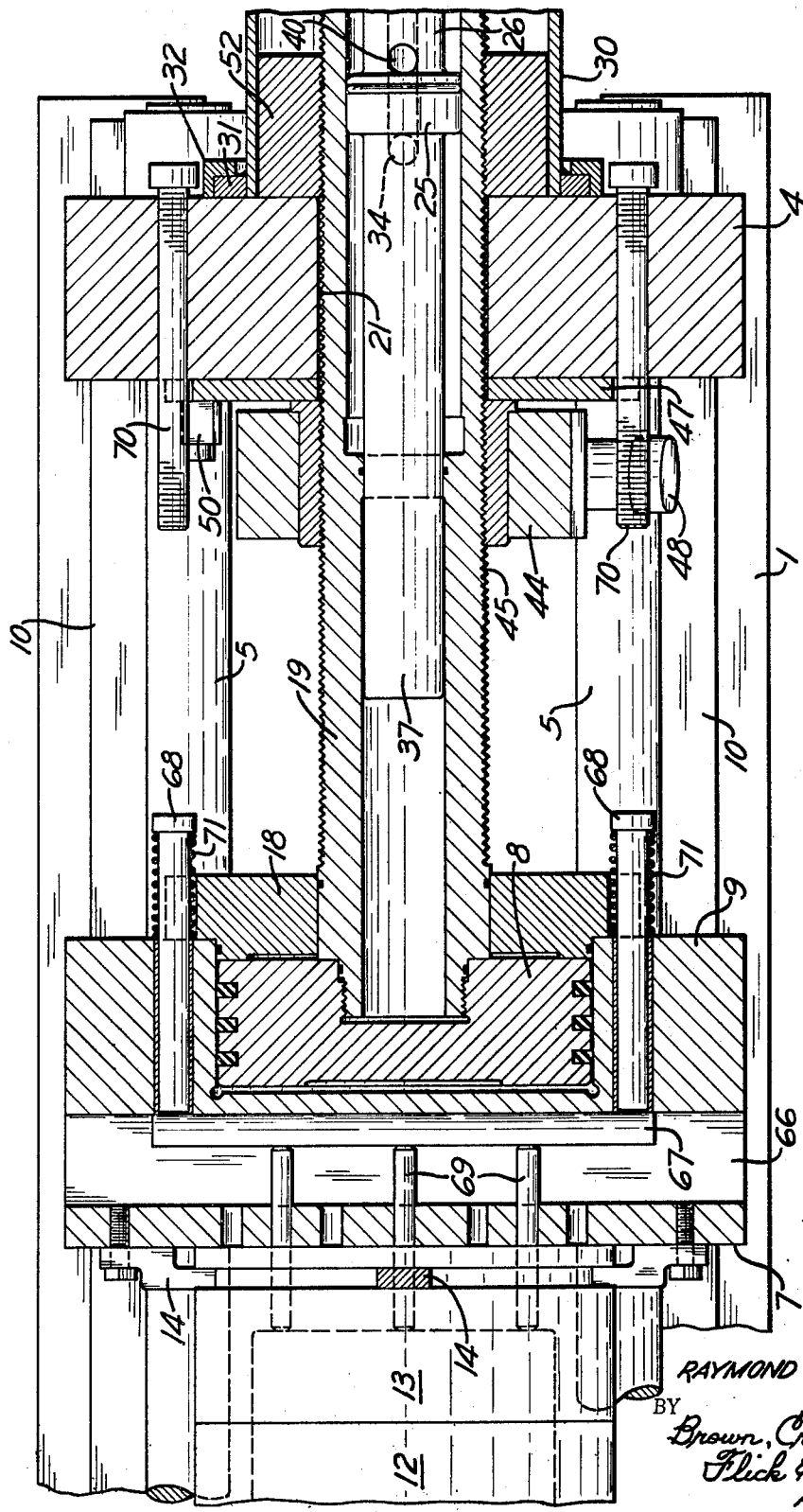

March 3, 1970    R. E. BROCHETTI    3,497,919
MOLD LOCK-UP MECHANISM FOR INJECTION MOLDING MACHINES
Filed Nov. 7, 1966    5 Sheets-Sheet 4
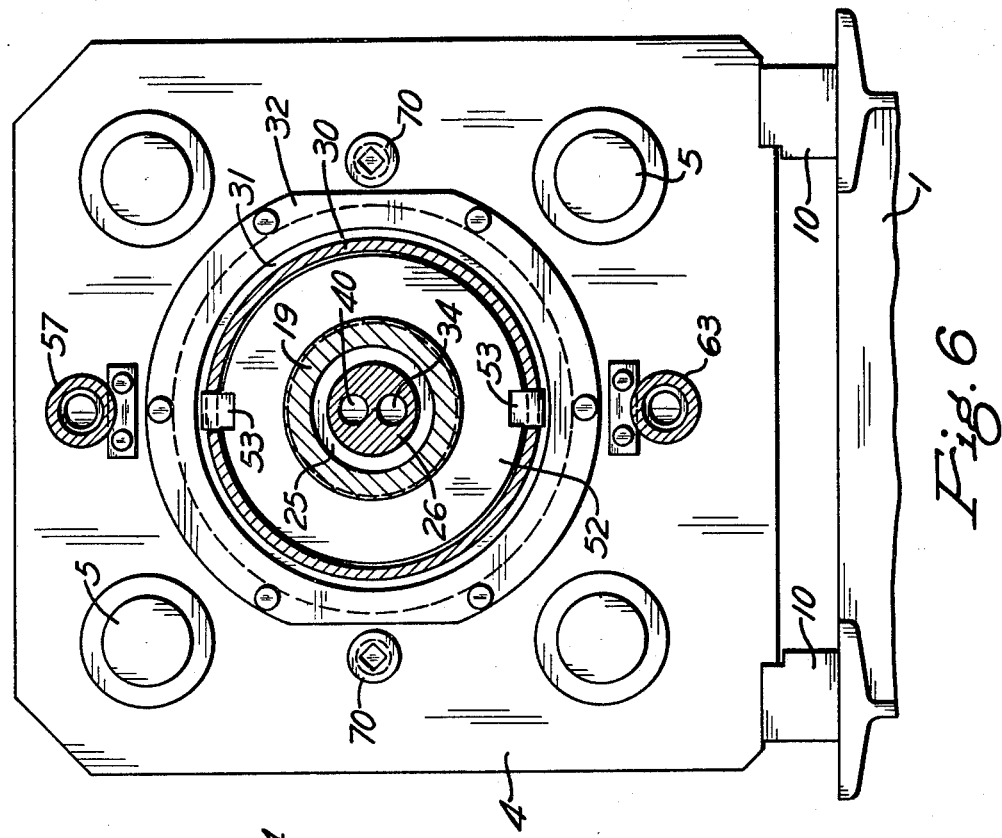
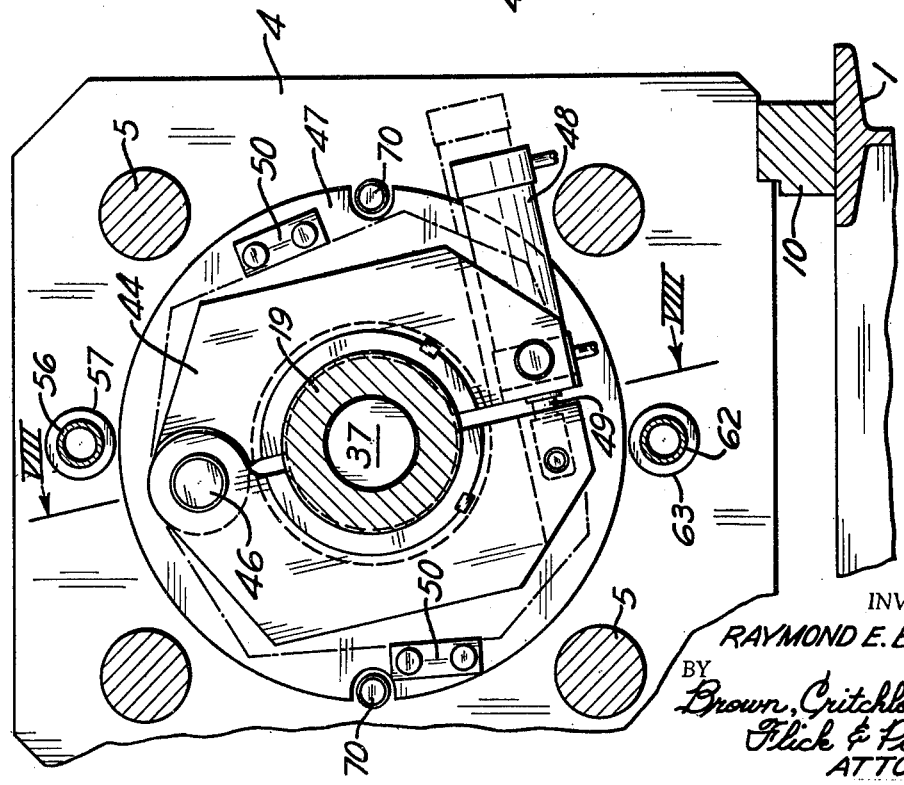
INVENTOR.
RAYMOND E. BROCHETTI
BY
Brown, Critchlow,
Flick & Peckham
ATTORNEYS.

INVENTOR.
RAYMOND E. BROCHETTI

United States Patent Office 3,497,919
Patented Mar. 3, 1970

3,497,919
MOLD LOCK-UP MECHANISM FOR INJECTION MOLDING MACHINES
Raymond E. Brochetti, 1212 Windermere Drive,
Pittsburgh, Pa. 15218
Filed Nov. 7, 1966, Ser. No. 592,580
Int. Cl. B29c 1/16; XB29f 1/00
U.S. Cl. 18—43                                      7 Claims

ABSTRACT OF THE DISCLOSURE

This disclosure relates to injection molding machines, and more particularly to the mechanism by which pairs of molds are locked tightly together while plastic material is being injected into their mold cavity under high pressure.

---

Figure 9:
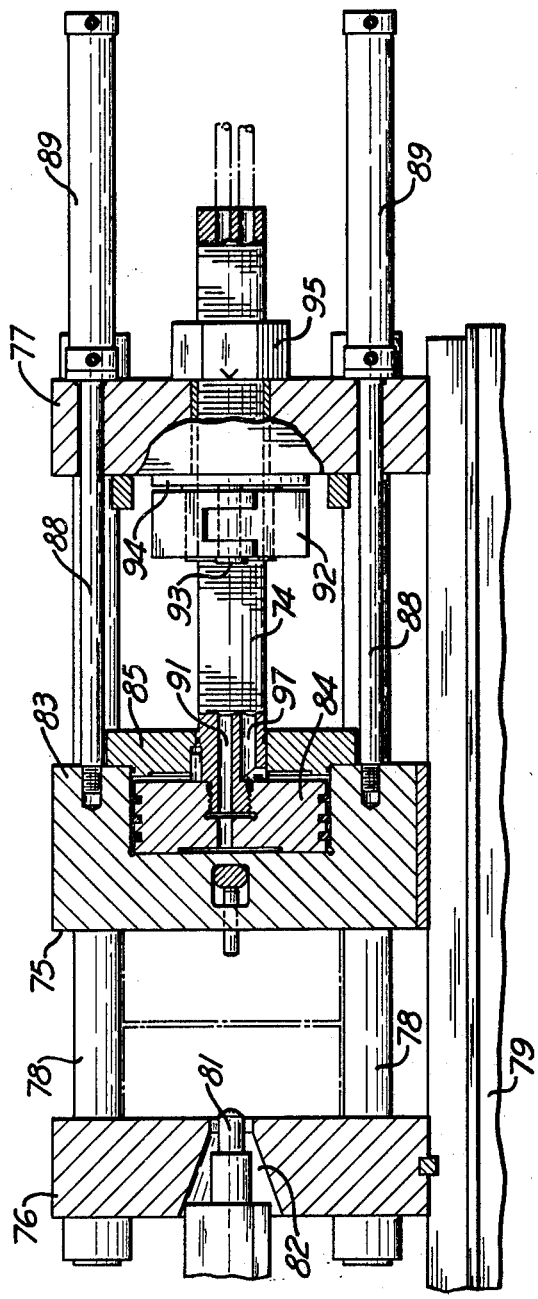

It is among the objects of this invention to provide a mechanism which can lock up injection machine molds under extremely great pressure, which uses only hydraulic pressure for locking up, which rigidly supports the lock-up means in locking up position, which permits the molds to be closed and opened rapidly, which is adjustable for different size molds and which is relatively simple in construction and operation.

In accordance with this invention the frame of the machine has spaced front and rear parallel end plates. The front plate is provided with a hole through which plastic material is injected into a mold cavity, and the rear plate has a central opening through it. Means are provided for holding the plates a fixed distance apart. Disposed between and parallel to the end plates is a movable die plate. The opposed faces of the die plate and the front end plate are provided with means for attaching cooperating molds thereto. Between the die plate and the rear end plate of the frame there is a fluid pressure ram for moving the die plate a short distance toward the front end plate. Fluid pressure means are provided for moving the shaft and ram forward together a predetermined distance. Releasable means in front of the rear end plate engages the shaft when it is in its forward position to hold the shaft against rearward movement. There also is means for delivering fluid under pressure to the ram after the shaft has been locked in its forward position. This forces the die plate ahead relative to the shaft for a short distance to press the molds tightly together. The holding means for the shaft is releasable from the shaft to permit rearward movement of the shaft after molding.

The invention is illustrated in the accompanying drawings, in which

FIG. 1 is a plan view of my lock-up mechanism;
FIG. 2 is a rear end view;
FIG. 3 is a vertical longitudinal section taken on the line III—III of FIG. 2, but showing the molds just before final lock up;
FIG. 4 is an enlarged fragmentary horizontal section taken on the line IV—IV of FIG. 3, with the molds locked up;
FIGS. 5, 6 and 7 are enlarged vertical sections taken on the lines V—V, VI—VI and VII—VII, respectively of FIG. 3;
FIG. 8 is a fragmentary section taken on the line VIII—VIII of FIG. 7; and
FIG. 9 is a sectional view, similar to FIG. 3, of a modification.

Referring to the drawings, the mold lock-up mechanism is mounted on one end of the bed 1 of an injection machine. Only the nozzle 2 of the injection machine is shown. The frame of the lock-up mechanism is formed from parallel vertical front and rear end plates 3 and 4 that are held a predetermined distance apart by any suitable means, such as by a plurality of tie rods 5. The frame is made strong enough to avoid any appreciable stretching while under great longitudinal pressure during the molding operation.

Between the two end plates there is a heavy die plate 7 at the front of a fluid pressure ram, which may consist of a large piston 8 and cylinder 9. Although the piston can be located at the front of the ram and the cylinder at the back, it is preferred that the cylinder be at the front and that the die plate be integral with the front of the cylinder. The cylinder and die plate can be moved lengthwise of the frame along guide rails 10 secured to the machine bed. Mold sections 12 and 13, provided with mating cavities and/or cores of any desired configuration, can be detachably connected to the opposite faces of the die plate and front end plate; that is, between those plates, by clamps 14 bolted to the plates. The front end plate is provided with a central hole 15, through which the nozzle 2 of the injection machine extends. The front part of the front mold section likewise is provided with a hole 16 (FIG. 3), in which the nozzle tip seats tightly during molding.

The fluid pressure cylinder 9 opens toward the rear end of the frame, but a closure ring 18 is bolted to the back of the cylinder around the cylinder chamber. The piston 8 inside the cylinder normally engages the front wall of the cylinder chamber and is spaced a short distance from the closure ring. The piston is rigidly mounted on the front end of a long hollow shaft 19 that extends back through closure ring 18, in which it is slidably mounted. To prevent the shaft from turning in the ring, they are provided with registering radial key ways in which a key 20 is disposed. The key can slide lengthwise in at least one of the key ways as the piston is moved back and forth in the cylinder. From the fluid pressure ram the hollow shaft extends back through a large central opening 21 in the rear end plate 4 of the frame.

Disposed inside of hollow shaft 19 is a piston 25. This piston is joined to a large piston rod 26 that extends back out of the rear end of the shaft, to which is bolted a ring 27 that is in sealing engagement with the rod. The rear end of the piston rod is mounted in fixed position so that its piston will remain stationary relative to the machine frame. Although the piston rod may be anchored in different ways, a preferred way of doing it is to clamp it by means of a nut 28 to a plate 29 that closes the rear end of a cyinldrical housing 30 encircling the piston rod and hollow shaft between the nut and the rear end plate of the frame. The front end of this housing is rigidly connected to the back of the rear end plate in such a manner that, when desired, the housing can be turned on its axis. Thus, a flange 31 encircling the front end of the housing can be clamped against the end plate by an encircling clamping ring 32 bolted to the plate.

It will be seen that by delivering fluid under pressure to the inside of the hollow shaft in front of the piston therein, the shaft and the fluid pressure ram attached to its front end can be moved forward together rapidly. A preferred way of delivering the pressure fluid to the shaft is to provide the piston rod and its piston with a longitudinal passage 34 that opens at its front end into the space in front of the piston and that is connected at its rear end with a source of fluid under pressure. For example, a block 35 can be bolted to the rear end of the piston rod and be provided with bores connecting passage 34 with the side of the block. A conduit 36 from a source of fluid under pressure can be screwed into the side of the block. Extending forward from the front of piston 25 is a reduced extension 37 that slides in the reduced front end portion of the hollow shaft.

To retract the hollow shaft and fluid pressure ram, the piston rod may be provided with another passage 40 beside passage 34, but this second passage opens at its front end into the chamber formed between the back of piston 25 and the sealing ring at the rear end of the shaft. The outer end of passage 40 opens into bores in block 35 connected by a conduit 41 with the pressure source. When fluid pressure is admitted to this conduit through a reversing valve 42 (FIG. 3), the other conduit 36 is connected by the same valve with exhaust so that the hollow shaft will slide rearwardly along the piston rod. When the valve is reversed, conduit 41 serves as the exhaust conduit.

The mold section 13 carried by the movable die plate 7 is not moved completely into engagement with the other mold section by the forwardly moving hollow shaft, but is stopped about one-eighth of an inch away, as shown in FIG. 3. The means for stopping the shaft will be described presently. However, when the forward movement of the shaft is stopped, it is then held rigidly in that position to prevent it from being moved rearwardly by the final locking up pressure. The holding means engages both the shaft and the front of the rear end plate, so that during molding the rearward force exerted against the shaft will be resisted by the end plate. The holding means includes a member 44 that can be moved into and out of a recess in the outer surface of the shaft in front of the rear end plate. While the holding member is projecting into the recess, the shaft cannot be moved backward, but after the holding member has been withdrawn from the recess the shaft can be moved back through the rear end plate.

In order to accommodate molds of different thicknesses, the hollow shaft should be provided with a series of recesses spaced lengthwise along the shaft. A simple and convenient way to form the recesses is to cut a screw thread in the outside of the shaft. The spaces between successive convolutions of the thread will then form the spaced recesses 45. In such a case, the holding member is made in the form of a nut that engages the screw thread. Since the nut must be released from the thread in order to permit the shaft to be retracted, a split nut is used that is formed in two sections, preferably hinged together at one side of the shaft by a hinge pin 46. The hinge pin may be connected directly to the rear end plate, but preferably it is rigidly mounted in a mounting plate 47 that is bolted to the front of the end plate.

The hinged nut can be opened and closed in various ways. One way of doing this, as shown in FIG. 7, is by fluid pressure admitted to one end or the other of a double acting cylinder 48, the front end of which is pivotally connected to the free end of one section of the nut. The piston rod 49 projecting from the front end of the cylinder is pivotally connected to the other section of the nut. When fluid under pressure is admitted to the front end of this cylinder, the piston rod is pulled into the cylinder and the nut is clamped onto the thread of the shaft. When fluid pressure is delivered to the outer end of the cylinder and the other end is connected to exhaust, the free ends of the nut are swung apart to release it from the shaft. To make sure that both sections of the nut will be swung away from the shaft, stops 50 are bolted to the mounting plate so that if only one section moves it will soon be stopped by one of the stops and then the other section will have to move.

Of course, the thread on the hollow shaft must be in just the right position for the threads in the hinged nut to register with it when the nut is closed. This orientation of the shaft thread can be maintained by another nut 52 screwed onto the shaft behind the rear end plate. This nut also serves as the stop that limits the forward movement of the shaft. Initially, the nut is turned on the shaft to cause the shaft threads in front of the end plate to be moved forward or backward the slight amount necessary for the hinged nut to register with them when stop nut 52 is in engagement with the back of the rear end plate. The position of nut 52 then is marked on the frame so that for any change in mold size the nut can be turned one or more full revolutions to move the shaft forward or backward the necessary distance, and yet the split nut will always register with the shaft thread. The shaft cannot turn, because of the key 20 in its front end, and to prevent the stop nut from turning on the shaft after the proper adjustment has been made the nut may be provided with a pair of radial lugs 53 that project into slots 54 in the surrounding housing 30. These slots extend lengthwise of the housing so that the lugs can slide toward the back of the housing to permit the shaft to be retracted. To turn the stop nut 52 on the shaft for the adjustment purposes just mentioned, the clamping ring 32 may be loosened temporarily to permit housing 30 to be rotated around the shaft. This, through lugs 53, will turn the nut on the shaft the desired number of revolutions, whereupon the clamping ring can be tightened again to lock the nut. If desired, a hinged nut similar to nut 44 can be substituted for nut 52.

After the hollow shaft has been moved forward by fluid pressure and locked by the hinged nut against rearward movement, fluid pressure is delivered to the fluid pressure ram between the front of its piston 8 and the front wall of its cylinder chamber. One way of doing this is to provide the cylinder 9 with a passage 55 that extends from the front of its chamber around to the rear end of the cylinder, where it can be connected with a flexible hose or, as shown, the front end of a tube 56 that is telescoped in a tube 57 rigidly mounted in the rear end plate. The rear end of this second tube is connected by a conduit 58 to a source of fluid pressure and to exhaust through a reversing valve 59 (FIG. 3). When fluid pressure is delivered to the front of the piston, the cylinder is moved ahead a short distance to press the two mold sections very tightly together as shown in FIG. 4. As mentioned before, the reaction to this pressure is taken by the hinged nut against the rear end plate. Great force can be exerted against the cylinder because of the large area of the front end of the piston.

After the mold has been filled through the opening in the front end plate of the frame and it is time to open the mold, the fluid pressure is released from cylinder 9 by reversing valve 59 and the cylinder can be moved backward a short distance by delivering pressure fluid to it between the closure ring 18 and the back of the piston. This fluid is introduced through a passage 61 in the back of the cylinder connected with the front end of a tube 62 telescoped in a rigidly mounted tube 63 connected to the valve 59 by a conduit 64. After this, the hinged nut is opened and fluid pressure is delivered to the hollow shaft behind the piston therein to retract the piston and ram in order to fully open the mold.

In order to facilitate rapid removal of articles from the mold, an automatic ejector is provided as shown in FIGS. 3 and 4. For this purpose, the die plate 7 is provided with a passage 66 extending transversely through it and containing a transverse bar 67 that can move forward and backward in the passage. The bar is supported at its ends by parallel pins 68 extending rearwardly through bores in the ram cylinder beside piston 8 and also through notches in the closure ring. One or more knock-out pins 69 engage the front of the bar and are slidably mounted in openings in the die plate in front of the transverse passage 66. They also slide in openings in the rear mold section behind the molding cavity. When the die plate is retracted with the rear mold section, the rear ends of the bar pins 68 come in contact with the front ends of stops 70 projecting from the rear end plate 4. These stops stop the pins so that the die plate and adjoining mold section continue to move backward around the stationary knock-out pins until after the front ends of the latter have entered the mold cavity. This forces the molded article out of the cavity. When the die plate is moved forward again, springs 71 on the bar pins retract the transverse bar in the transverse passage 66.

In the modification shown in FIG. 9, there is no piston in the central shaft 74 to permit the movable die plate 75 to be driven forward. Instead, the main hydraulic drive for the die plate is produced by independent cylinders. This particular machine has front and rear end plates 76 and 77 connected by tie rods 78 and mounted on a machine bed 79. The nozzle 81 of the injection machine extends through an opening 82 in the front plate. The movable die plate between the end plates is integral with the cylinder 83 of the ram, which contains a piston 84 rigidly mounted on the front end of shaft 74. This shaft extends rearwardly through a closure ring 85 fastened to the back of the cylinder and also is slidably mounted in the rear end plate.

To move the shaft, ram and die plate forward and backward, the cylinder of the ram is connected to pistons 88 that extend back through the rear end plate into double-acting cylinders 89 connected to the back of that plate. When fluid under pressure is delivered to the rear ends of these two cylinders, the die plate is moved forward rapidly. When the cylinders are reversed, the die plate is moved backward. As the die plate is moved, shaft 74 is moved with it. Whatever mold sections that are carried by the movable die plate and the front end plate are not moved by the cylinders into engagement with each other at this time, but are stopped a short distance apart as described in connection with the first embodiment.

After the movable die plate has been moved forward by hydraulic cylinders 89 to the position shown in FIG. 9, fluid pressure is delivered to ram cylinder 83 in front of piston 84 to drive the movable die plate ahead a short distance in order to lock up the mold. This pressure is admitted to the cylinder through a passage 91 extending lengthwise through shaft 74 and the ram piston. The rear end of the passage is connected in any suitable manner with a conduit leading to a source of fluid under pressure. The ram is prevented from moving backward by holding means engaging the shaft and the front of the rear end plate. As previously described, the holding means may include a split nut 92, the two parts of which are hinged together by a hinge pin 93 rigidly mounted in a mounting plate 94 that is bolted to the rear end plate. In such a case, the shaft is threaded, and to limit the distance it can be moved forward a lock nut 95 or the like is mounted on the shaft for engagement with the back side of the rear end plate. This nut also assures the split nut always registering with the shaft thread.

To unlock the mold, fluid pressure is delivered between the back of the ram piston and closure ring 85 through a passage 97 extending longitudinally of shaft 74 and connected at its rear end with a conduit leading to the pressure source. Fluid under pressure is maintained in passage 97 while the ram cylinder is being moved forward, whereby to hold piston 84 in the front end of the cylinder until shaft 74 is locked in its forward position.

I claim:

1. Injection molding machine lock-up mechanism for molds, comprising spaced front and rear parallel end plates, the front plate being provided with an injection hole and the rear plate having a central opening therethrough, means holding said plates in fixed relation to each other, a movable die plate disposed between and parallel to said end plates, means for attaching cooperating molds to the opposed faces of said front end plate and die plate, a fluid pressure ram between the die plate and rear end plate for moving the die plate a short distance toward the front end plate, a shaft secured at its front end to the ram and extending rearwardly therefrom through said rear end plate opening, fluid pressure means for moving the shaft and ram forward together a pre-determined distance, the shaft being provided along its outer surface with a plurality of spaced recesses, releasable holding means in front of said rear end plate for selectively engaging the shaft in any of said recesses when it is in its forward position to hold the shaft against rearward movement in said central opening, and means for delivering fluid under pressure to said ram while the holding means is holding the shaft stationary, whereby to force said die plate ahead relative to the shaft, said holding means being releasable from the shaft to permit rearward movement of the shaft after molding.

2. Injection molding machine lock-up mechanism according to claim 1, including means adjustable along said shaft behind said rear end plate for limiting forward movement of the shaft.

3. Injection molding machine lock-up mechanism according to claim 1, in which said holding means is a split member encircling said shaft and movable into and out of engagement with said recesses.

4. Injection molding machine lock-up mechanism according to claim 3, in which said recesses are formed by a screw thread cut in said shaft, and said split member is a nut engaging said thread.

5. Injection molding machine lock-up mechanism according to claim 4, in which the split nut is formed in two parts hinged together at one side of the shaft by a pin connected with said rear end plate.

6. Injection molding machine lock-up mechanism according to claim 1, in which said recesses are formed by a screw thread cut in said shaft, and said holding means is a split nut movable into and out of engagement with said thread, said mechanism including a nut adjustable along the shaft behind said rear end plate for limiting forward movement of the shaft.

7. Injection molding machine lock-up mechanism according to claim 1, in which said shaft is hollow and provided on its outer surface with a screw thread, said mechanism including a piston disposed in the hollow shaft, a piston rod secured to said piston and extending out of the rear end of the shaft, a nut adjustable along the shaft behind said rear end plate for limiting forward movement of the shaft, means connected to said rear end plate and extending rearwardly therefrom for normally holding said nut against rotation, and means rigidly connecting said piston rod to said nut-holding means, said fluid pressure means including means for delivering fluid under pressure to the inside of the hollow shaft in front of said piston.

References Cited

UNITED STATES PATENTS

| | | |
|---|---|---|
| 3,120,039 | 2/1964 | Stubbe et al. |
| 3,263,277 | 8/1966 | Ohlendorf et al. |
| 3,270,372 | 9/1966 | Hesse. |
| 3,375,757 | 4/1968 | Forjancic. |

FOREIGN PATENTS

| | | |
|---|---|---|
| 998,665 | 7/1965 | Great Britain. |

WILBUR L. McBAY, Primary Examiner

U.S. Cl. X.R.

18—30; 164—343